United States Patent [19]

Kraus

[11] Patent Number: 4,694,704
[45] Date of Patent: Sep. 22, 1987

[54] INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 892,373

[22] Filed: Aug. 4, 1986

[51] Int. Cl.⁴ .................. F16H 15/08; F16H 15/10
[52] U.S. Cl. .................................. 74/200; 74/199; 74/501 R
[58] Field of Search ............... 74/89.2, 89.22, 108, 74/502.6, 198, 199, 200

[56] References Cited

U.S. PATENT DOCUMENTS

| | | | |
|---|---|---|---|
| 529,714 | 11/1894 | Cummings | 74/200 |
| 3,025,647 | 3/1962 | Moody | 74/89.22 |
| 3,141,343 | 7/1964 | Rieckenberg | 74/89.22 |
| 3,486,391 | 9/1968 | Kraus | 74/200 |
| 3,788,713 | 1/1974 | Kraus | 384/125 |
| 3,810,398 | 5/1974 | Kraus | 74/200 |
| 4,086,820 | 5/1978 | Kraus et al. | 74/200 |
| 4,453,427 | 6/1984 | Kraus et al. | 74/200 |

Primary Examiner—Lawrence Staab
Assistant Examiner—Joseph J. Meter

[57] ABSTRACT

In a rotary traction roller transmission having oppositely disposed toric discs mounted on its input and output shafts, and motion transmitting rollers frictionally engaged between the toric discs for transmitting motion from one toric element to the other, the rollers are supported on pivot shafts which are interconnected by at least one cable looped around flanges of the pivot shafts and having tubular sections mounted thereon and fittingly received in corresponding cavities formed in the pivot shaft flanges for operative engagement therewith.

4 Claims, 4 Drawing Figures

INFINITELY VARIABLE TRACTION ROLLER TRANSMISSION

BACKGROUND OF THE INVENTION

The invention relates to a traction roller transmission in which motion is transmitted from an input shaft to an output shaft by traction rollers arranged between, and in engagement with, toric discs mounted opposite each other on the input and output shafts.

In such transmissions the traction rollers are supported on support trunnions which permit pivoting of the traction rollers for adjustment of different transmission ratios as described in detail in applicant's U.S. Pat. No. 3,810,398. A change of the transmission ratio is initiated by slight axial movement of the trunnions out of their center positions which movement causes the traction rollers to walk to different circles of engagement with the toric discs. The traction roller support trunnions are preferably supported by tension sheets in order to avoid that vibrations enter the transmission housing. Concurrent pivoting of the trunnions is insured for example by transmission bands or cables which are connected to and extend between flanges of the trunnion and cross-over between opposite trunnions for the pivoting of the opposite trunnions in an opposite sense as disclosed in detail in applicant's U.S. Pat. No. 4,086,820. The ends of the bands or cables are fastened to the flanges of the trunnions by fastening means such as bolts.

It has been found however that occasional jerky motions of the trunnions will cause the cables or bands to be ripped out of their engagement with the trunnions no matter how securely they are fastened.

It is the object of the present invention to provide an arrangement wherein the cables extending between the pivot movement of opposite pivot shafts are not ripped off the flanges of the pivot shafts whose pivot motions they coordinate.

SUMMARY OF THE INVENTION

In an infinitely variable traction roller transmission in which the power transmitting traction rollers are disposed between toric discs carried by input and output shafts the toric discs are forced toward each other and in frictional engagement with the traction rollers. The traction rollers are mounted on pivotal support structures to permit change of the transmission ratio. Correlating means are provided which interconnect the pivotal support structures for common pivoting in opposite direction which correlating means, however, permit limited independent pivotal movement, while resiliently drawing the support structures into the same angular positions and accordingly the traction rollers into the same circles of contact with the toric discs.

A cable loop provided with tube sections extends around flanges formed on the pivotal support structures with the tube sections received in corresponding cavities in the flanges for operative engagement between the cables and the pivotal support structures to insure concurrent pivoting thereof.

DESCRIPTION OF THE PREFERRED EMBODIMENT

Figure 1:
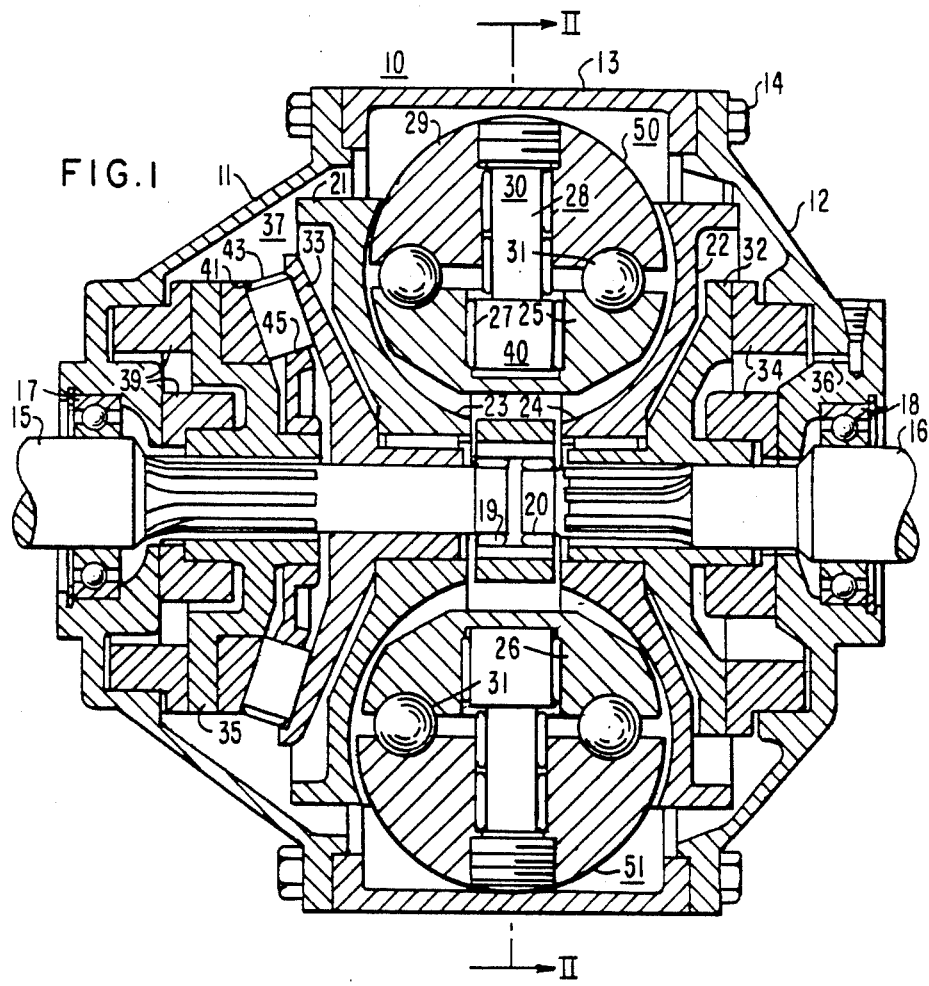
FIG. 1 is a cross-sectional view of the traction roller transmission showing the general arrangement off the elements of the device.

As shown in FIG. 1, the rotary motion transmitting device comprises a housing 10 consisting of a central part 13, a front part 11 disposed at one end of the central part 13 and a rear part 12 disposed at the opposite end of the central part 13. The housing parts 11, 12 and 13 are held together by tension bolts 14. Coaxial input and output shafts 15 and 16 extend through the front and the rear parts 11 and 12 of the housing 10 and are rotatably supported by input and output shaft bearings 17 and 18 and by central support bearings 19 and 20, or alternatively, one shaft may extend into a central bore in the other shaft to be supported therein.

The input shaft 15 carries an input traction disc 21 and the output shaft 16 carries an output traction disc 22 disposed opposite the input traction disc. The traction discs 21 and 22 have opposite toroidal surfaces 23 and 24 and are adapted to engage therebetween power rollers 25 and 26 for the transmission of motion from the input traction disc to the output traction disc. The power rollers 25 and 26 are supported by bearings 27 on a shaft 28 journalled in a roller support structure 29. The shaft 28 has eccentric bearing portions 30 and 40 to permit slight movement of the rollers in a direction normal to the shaft axis when necessary for firm engagement with the input and output traction discs. Axial support is provided for the power rollers 25 and 26 by axial thrust bearings 31 for example of the type as described in U.S. Pat. No. 3,486,391.

The output traction disc 22 is mounted on an axial output thrust member 32 supported on the output shaft 16 for rotation therewith. A hydrostatic axial thrust bearing and seal structure 34 is disposed between the axial thrust member 32 and the housing part 12 to provide axial support for the thrust member 32 and the output traction disc 22.

The input traction disc 21 is mounted on an axial input thrust member 33 which is freely rotatable on the input shaft 15 and together with an axial pressure plate 35 forms a load cam structure 37 for forcing the input traction disc 21 toward the output traction disc 22 and both discs into engagement with the power rollers when a torque is transmitted through the transmission. Adjacent the input thrust member 33, the pressure plate 35 has cam faces 41 with cam rollers 43 disposed between the thrust member 33 and the cam faces 41 to be wedged therebetween when a torque is applied to the input shaft. The rollers 43 are held in position by a cage 45. The pressure plate 35 is mounted on the input shaft 15 for rotation therewith and axially supported by the hydrostatic axial thrust bearing 39 disposed between the pressure plate 35 and the housing part 11. The hydrostatic axial thrust bearings 39 and 34 are preferably of the type described in the present inventor's earlier U.S. Pat. No. 3,788,713. Hydraulic fluid is supplied to the bearings through passages 36 as shown in FIG. 1 only for bearing 34.

Figure 2:
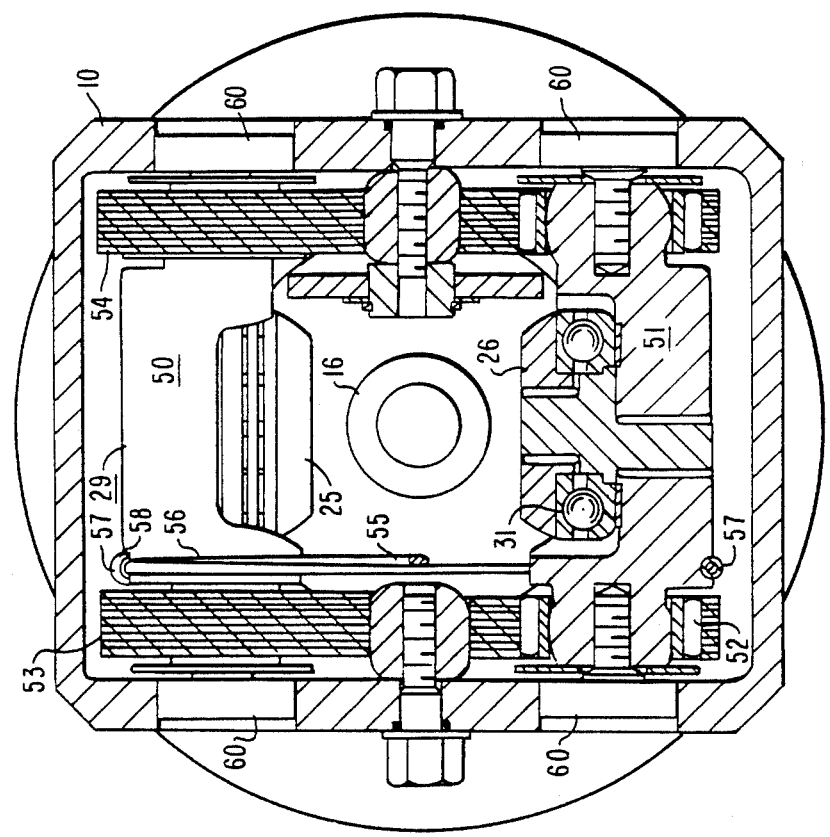
FIG. 2 is a cross-sectional view along lines II—II of FIG. 1.

The roller pivot structure 29 is more clearly shown in FIG. 2. The rollers 25 and 26 are supported in the housing 10 by pivot shafts 50 and 51 which are disposed in radial symmetry with respect to the input and output shafts, that is, with two rollers, diametrically opposite each other and supported by radial bearings 52 on tension sheets 53 an 54 which take up the radial bearing load as caused by the contact forces of the rollers 25 and 26. The pivot shafts 50 and 51 are slightly movable axially by operating means such as hydraulic cylinder and piston structures 60 arranged at opposite axial ends of the pivot shafts 50 and 51 to initiate pivoting of the pivot shafts resulting in a change of the transmission ratio. The contact forces of both opposite power rollers 25 and 26 are the same and the radial resultants directed to opposite directions are balanced by the tension sheets so that the housing 10 is not subjected to such forces and to vibrations as caused by the power rollers 25, 26.

In order to insure coordination of the pivoting movement of the pivot shafts 50 and 51, that is, to insure the same pivot movements, the pivot shafts 50, 51 are in engagement with one another by a transmission cable 55 which is disposed in grooves 56 formed in flange areas of the pivot shafts 50, 51.

Figure 3:
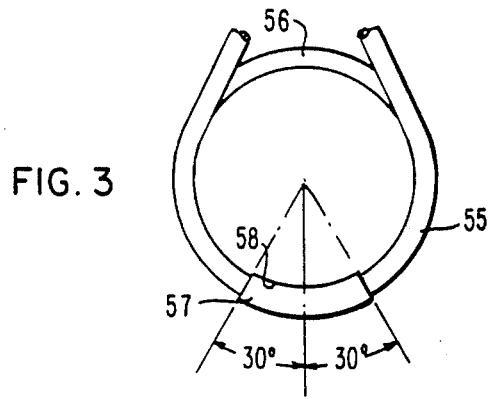
FIG. 3 is a view of the pivot shaft in the plane including the cable receiving groove.

The cable 55 is a standard looped steel cable of the appropriate length to fit around the pivot shaft flanges and is provided with crimped-on tube sections 57 of a diameter larger than the cable which tube sections fit into cavities 58 (FIG. 3) formed in the pivot shaft flanges for operative engagement of the cable with the pivot shafts 50, 51. The cavities 58 are so arranged that they are generally in the center of the angular area engaged by the cable 55, that is, they are formed at the oppositely disposed outer flange areas when the pivot shafts are in a 1:1 transmission ratio position. The circumferential extent of the cavities is preferably about 60° and the crimped tube sections are of corresponding length in order to provide a sufficiently large area of engagement between the tube sections and the cable.

Figure 4:
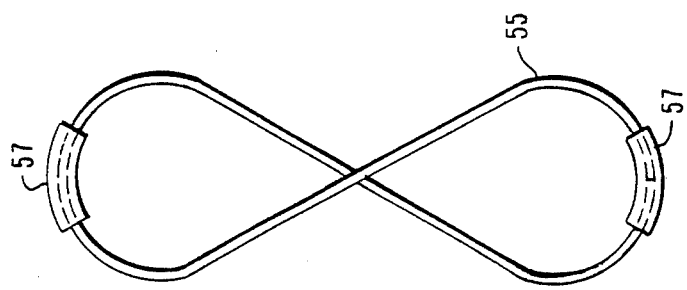
FIG. 4 shows the cable adapted to extend around the opposite pivot shafts.

FIG. 4 shows the cable alone with the tube sections 57 crimped onto the cable. At the center the cable crosses over in order to provide for the pivoting movement of the opposite pivot shafts in opposite directions. In order to avoid wear of the cable at the cross-over point the grooves in the pivot shaft flanges may be formed with a slight pitch such that the cables are slightly spaced at the cross-over point. If two cables are used, for example, one adjacent each of the tension sheets, the pitch of the cable receiving grooves should be made in an opposite sense so as to balance axial force caused by the arrangement.

The cables may be made endless or they may consist of the required length with the ends disposed within one of the crimped tube sections so as to form a closed loop as shown in FIG. 4.

What is claimed is:

1. An infinitely variable traction roller transmission comprising: coaxial input and output shafts; oppositely disposed toric elements, one being supported by each of said shafts for rotation therewith; at least two motion transmitting rollers disposed between said toric elements in radial symmetry with respect to the axis of the input and output shafts; and means for forcing said toric elements toward each other to cause frictional engagement of the motion transmitting rollers with the opposed surfaces of the toric elements; a support structure for each of said rollers, each of said support structures including a pivot shaft having a pivot axis normal to a plane which includes the axis of the input and output shafts, said pivot shafts having flanges arranged opposite one another, each provided with a circumferential groove and an endless cable loop extending around said flanges of the opposite pivot shafts with a cross-over therebetween, said cable having tube sections of a given length firmly mounted thereon and said grooves having areas of increased width and of a circumferential length corresponding to the given length of said tube sections, said tube sections being fittingly received in said groove areas of increased width for operative engagement of said cable loop with said pivot shafts.

2. A traction roller transmission according to claim 1, wherein said tube sections are crimped onto said cable.

3. A traction roller transmission according to claim 1, wherein said cable has cable ends disposed within one of said tube sections and firmly engaged therewith so as to form said endless loop.

4. A traction roller transmission according to claim 1, wherein the circumferential length of the increased width cavity of said groove and the respective length of said tube section correspond to an angular extent of about 60°.

* * * * *